Jan. 2, 1968  H. H. BORSVOLD  3,361,417
APPARATUS AND METHOD FOR SUSPENDING HEATED STRIP MATERIAL
Filed Dec. 14, 1965
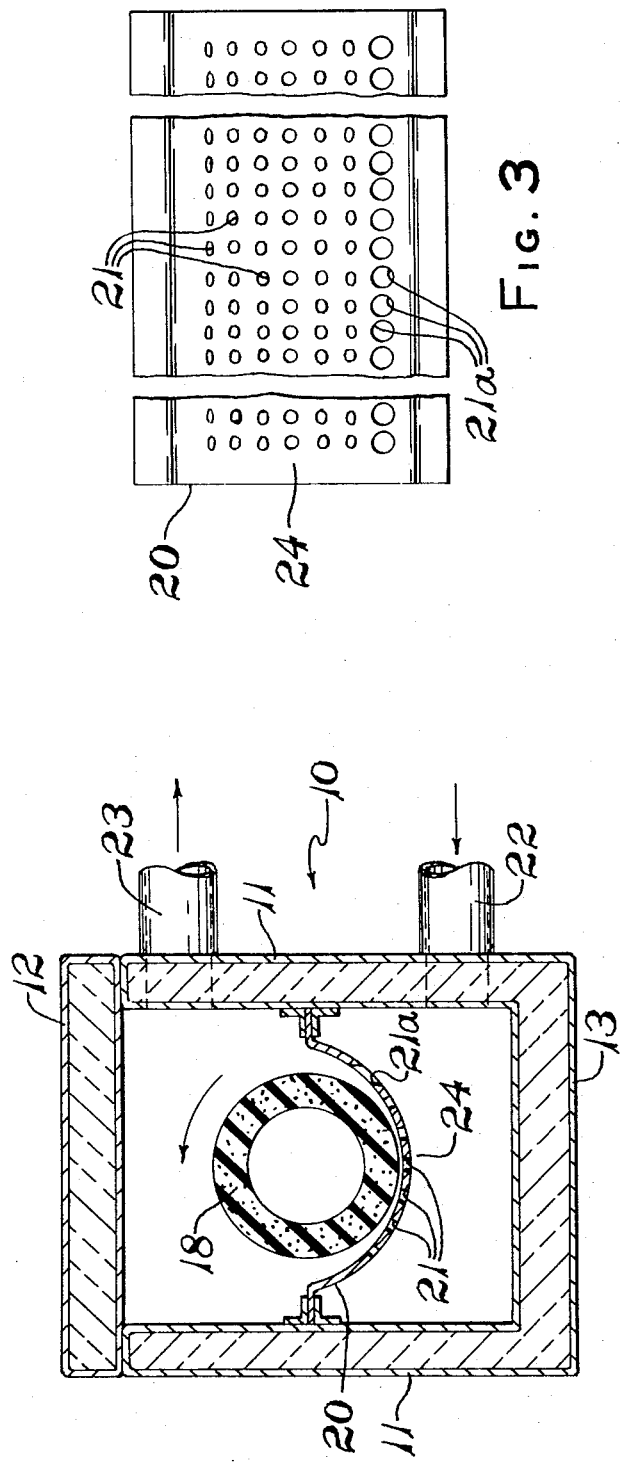
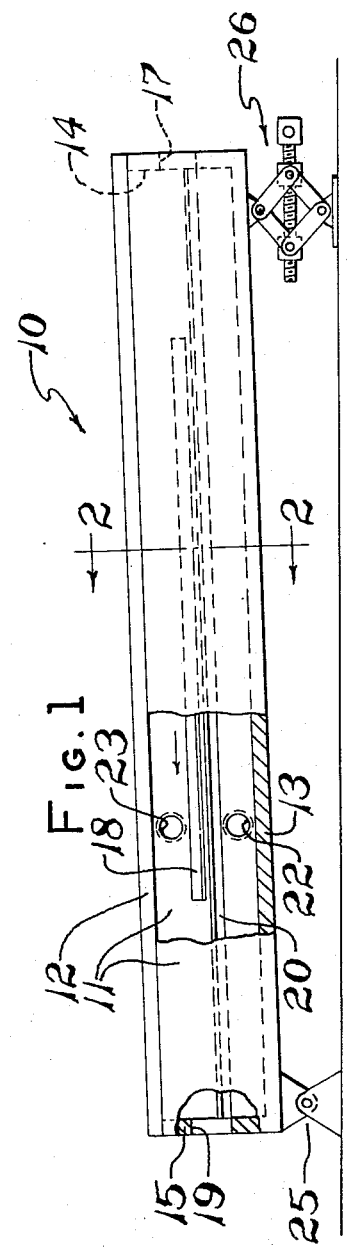
INVENTOR.
HERBERT H. BORSVOLD
BY James P. Lindsay
ATTY.

United States Patent Office 3,361,417
Patented Jan. 2, 1968

3,361,417
APPARATUS AND METHOD FOR SUSPENDING HEATED STRIP MATERIAL
Herbert H. Borsvold, 861 Acorn Road, Orange, Conn. 06477
Filed Dec. 14, 1965, Ser. No. 513,712
3 Claims. (Cl. 263—3)

ABSTRACT OF THE DISCLOSURE

In the manufacture of cylindrically-shaped rubber or rubber-like strip material, a discrete length of strip material is heated in a chamber by suspending the strip on a cushion of air created by air under pressure being emitted through perforations in a plenum plate which separates the chamber into an upper section and a lower section. The strip of material so suspended is rotated by directing a force of air along one side of the strip material that is greater than the force of air which maintains the strip material suspended. The plenum plate is canted downwardly as it extends from the entrance end of the heating chamber toward the discharge end of the heating chamber to cause the strip material to float naturally toward the discharge end of the heating chamber.

---

This invention relates to the manufacture of cylindrical rubber or rubber-like strip material and pertains more particularly to the conveyance of discrete lengths of such strip material through a heating zone.

In the manufacture of cylindrical rubber strip material other than by molding the product in a closed mold, a suitable rubber composition is fed through an extruder provided with an appropriately shaped die to form a cylindrical shaped strip, either of solid or tubular cross-section. The extruded rubber strip then is conveyed through a heating chamber in order to transform the rubber stock into a desired cured condition. If a cellular rubber product is desired a chemical blowing agent is included in the rubber composition so that as the extruded strip is conveyed through the heating zone the chemical blowing agent is caused to decompose to effect the expansion of the rubber composition into a cellular structure. Whether the resulting chemically blown rubber has an interconnecting cellular structure (open-cell sponge) or is composed of a non-communicating cellular structure (closed-cell sponge) depends largely upon the physical properties of the rubber composition at the time it is expanded. If the rubber composition is quite plastic and has little strength when is is expanded, an interconnecting cellular structure normally will be formed. In making a closed-cell gas expanded rubber, the rubber usually is partially vulcanized (at a temperature below that at which the blowing agent decomposes) before the rubber composition is expanded in order to strengthen the rubber and prevent the rupture of the cell walls as the rubber is blown. Whether the rubber composition is partially vulcanized or not during its advance through the heating zone, it still is sufficiently plastic before being fully cured that it cannot be supported on an unyielding surface as it is being advanced through the heating zone without becoming distorted in shape merely because of its own weight. In addition, if the strip material is to be expanded into a cellular structure during its conveyance through the heating zone, the frictional contact of the rubber strip with a non-fluid surface prevents the rubber composition from expanding uniformly in all directions causing additional distortion of the rubber strip.

In the copending application Ser. No. 475,219 of Leon Talaly and Herbert H. Borsvold, filed July 27, 1965, the disclosure therein being included herein by reference, it was suggested that the strip material be suspended on a cushion of air throughout its entire advance through the heating zone. The suspension of the strip material on a cushion of air is accomplished, as fully described in the said copending application, by advancing the strip material into an elongated heating chamber (separated into an upper section and a lower section by a plenum plate that extends transversely between the side walls of the heating chamber and longitudinally from the front wall of the heating chamber to the back wall of the heating chamber) and onto a cushion of air created by air emitted under pressure from the lower section of the heating chamber through closely-spaced perforations provided in the plenum plate and into the upper section of the heating chamber. The strip material is advanced through the heating chamber by canting the chamber so that the end of the heating chamber into which the strip material is fed is at a higher elevation than the discharge end of the chamber which canting causes the strip material literally to slide down the cushion of air on which it is suspended toward the discharge end of the chamber.

In the manufacture of discrete lengths of cylindrical shaped strip material, it has been found desirable, in addition to suspending and conveying the strip material on a cushion of air in accordance with the invention described in the said copending application, to rotate the cylindrical strip material about its longitudinal axis. The present invention, accordingly, is directed to the manufacture of discrete lengths of cylindrical strip material wherein the strip material not only is suspended and conveyed through a heating chamber on a cushion of air but at the same time is rotated about its longitudinal axis. The rotation of the strip material about its axis is accomplished by exerting a tangential air force along the length of strip material as the strip is suspended and conveyed through the heating chamber on the cushion of air.

The invention will be more fully understood from the following detailed description of an embodiment of the invention and by referring to the drawing in which:

FIG. 1 is a side elevation view, partly broken away and in section, of a heating chamber which embodies the present invention;

FIG. 2 is an enlarged view on the line 2—2 of FIG. 1; and

FIG. 3 is a plan view of the perforated plenum plate employed in the heating chamber shown in FIG. 1.

Referring to the drawing, FIG. 1 depicts an elongated heating chamber 10 comprised of side walls 11, 11, top plate 12 (which is shown as being removable to allow access to the interior of the chamber 10), bottom plate 13, front wall 14 and back wall 15, all of which are provided with sufficient heat-insulating to prevent objectionable heat loss through the walls of the chamber. The front wall 14 is provided with an opening 17 through which the strip material 18, which previously has been formed and cut to a preselected length, is fed into the heating chamber 10. The back wall 15 also is provided with an opening 19 through which the strip material 18 passes as it is discharged from the heating chamber 10. The heating chamber 10 is divided longitudinally into an upper section and a lower section by a transversely disposed perforated plenum plate 20. The perforations 21, 21 in plenum plate 20 allow heated air introduced under pressure into the lower section of the heating chamber 10 to escape into the upper section of the heating chamber 10 and suspend the entire length of the strip material 18 confined within the heating chamber on a cushion of air.

The heating chamber 10 is heated to the desired temperature (or temperatures. by one or more heating systems. The heating chamber 10 can be divided into several compartments by vertical transverse partitions, if desired, to allow heating zones of different temperature to exist through which the strip material 18 is advanced as it is conveyed through the chamber 10, the partitions each being provided with an opening therein to allow the strip material to pass from one compartment into the next. If the heating chamber 10 is divided into several compartments by such partitions, a separate heating system should be provided for each compartment so that the temperature can be different in each compartment. Even if the heating chamber 10 is not partitioned (through use of vertical transverse partitions) into more than one compartment, it, nevertheless, is desirable to employ several heating systems spaced along the length of the heating chamber 10 to insure a fairly even temperature throughout the length of the chamber. The heated air is introduced continuously under pressure into the lower section of the chamber 10 through conduit 22 and is withdrawn from the upper section of the chamber 10 through conduit 23.

The perforations 21, 21 are provided in the central longitudinally extending region 24 of the plenum plate 20 which underlies the desired path of conveyance in chamber 10 along which the strip material 18 is to be advanced. The perforations 21a, 21a disposed along one side margin of the said central region 24 are larger than the other perforations 21, 21 in the plenum plate 20 to cause the strip material 18 to rotate about its longitudinal axis, as will be explained in greater detail hereinafter. The said central region 24 of plenum plate 20 desirably is concaved downwardly, as shown clearly in FIG. 2, to maintain the strip material 18 centered over the perforated central region 24. The central region 24 is provided with a uniform pattern of the closely-spaced perforations 21, 21 to provide a uniform lifting force (derived from the hot air rising under pressure up through the perforations 21, 21) suitable for suspending the strip material 18 on a cushion of air rather than allowing the strip material 18 to contact plenum plate 20. It will be appreciated that the strip material 18 consequently will not be distorted as a result of frictional engagement with a non-fluid supporting surface and can expand freely without restraint if a blowing agent has been incorporated in the composition from which the strip material is formed. The larger perforations 21a, 21a disposed along one side margin of the central region 24 of the plenum plate 20 allow a greater volume of air to pass upward through the plenum plate 20 in this area of the perforated plenum plate per square inch of surface than do the smaller perforations 21, 21. As a result, a greater upwardly directed force is applied tangentially along one side of the strip material 18 as it is conveyed through the chamber 10 which causes the strip material 18 to revolve about its longitudinal axis while at the same time it is suspended on the cushion of air directed against its under surface by the air passing upwardly through perforations 21, 21. The central region 24 of the plenum plate 20, exclusive of the marginal zone in which perforations 21a, 21a are located, desirably has a void area (the "void area" being the area of the central region 24 of the plenum plate 20 represented by the perforations 21, 21 as compared to the area of the same region of the plenum plate if it were not perforated) of from 1 to 10 percent, although it will be understood that the percent of void area required to suspend the strip material 18 will depend somewhat on the cross-sectional size and weight per unit length of the strip material being conveyed through the chamber 10, as well as the differential in pressure of the heated air between the lower section and upper section of the chamber 10 on either side of plenum plate 20.

The rear end of the heating chamber 10 is pivotally mounted on bracket 25 while the front end of the chamber 10 is mounted to a jack assembly which allows the front end of the chamber 10 to be raised to a height above the rear end of the chamber 10 whereby the chamber 10 and, as a consequence, plenum plate 20 slope downwardly as they extend rearwardly from the front of the chamber 10. The reason for canting the heating chamber 10, and consequently the plenum plate 20, downwardly as they extend from the forward end of the chamber 10 to the discharge end of the chamber 10 is to cause the strip material 18 to advance through the heating chamber 10 without the need for pulling it through or pushing it through the chamber. When the plenum plate 20 is sloped as described above, the gravitational force exerted on the strip material may be considered to comprise a horizontal component which causes the strip material to slide down the cushion of air that supports it toward the discharge end of the chamber thereby causing the strip material to advance through the chamber. The degree of cant imparted to the heating chamber 10 may be varied depending upon the rate at which it is desired to advance the strip material through the heating chamber, although a slope (with respect to the horizontal) of between $\frac{1}{10}°$ and 6° normally is employed.

When it is desired to employ the heating chamber 10, a length of cylindrically shaped strip material 18 that is of a desired length is fed through opening 17 in front wall 14 into the zone immediately above the perforations 21, 21 in plenum plate 20 and onto the cushion of air resulting from the continuous discharge of heated air from the lower section of the heating chamber 10 into the upper section of the heating chamber 10 through perforations 21, 21 of plenum plate 20. The strip material 18 thereafter is maintained suspended upon the cushion of air and is rotated about its longitudinal axis as a result of the upwardly directed tangential force applied along one side of the strip material 18 by virtue of the volume of air passing upwardly through perforations 21a, 21a of plenum plate 20 which perforations 21a, 21a have larger diameters than perforations 21, 21. The strip material 18 advances toward the discharge end of the heating chamber 10 because of the downward cant imparted to the plenum plate 20 and is discharged from the heating chamber 10 through opening 19 in the back wall 15 of the chamber.

The temperature (or temperatures) to be employed in the heating chamber 10 will vary, of course, depending upon the operation (or operations) to be performed by the chamber 10. For example, if the strip material 18 is to be partially vulcanized, expanded, and then further vulcanized in the chamber 10, the chamber should be divided into three compartments (by vertical transverse partitions). The first compartment of the chamber 10 into which the strip material 18 is introduced would be maintained at a temperature sufficient to cause the rubber composition from which the strip material 18 is formed to become partially cured as it is advanced through the compartment but insufficient to cause the blowing agent in the rubber composition to decompose. The temperature in the next compartment would be sufficient to cause decomposition of the blowing agent in order to cause the rubber composition from which the strip material 18 is formed to expand into a cellular structure. The temperature in the last compartment would be maintained sufficiently high to cause the expanded rubber composition to cure to the desired degree. To illustrate, the temperature in the compartment in which partial vulcanization is to take place might be 250° F. (provided a blowing agent is used that does not decompose at 250° F. or below). The temperature in the middle compartment may be 280° F. (provided a blowing agent that decomposes between 250°–280° F. is used), and the temperature in the last compartment may be 300° F.

The size and spacings of the perforations 21, 21 and/or the pressures in the upper and lower sections of the chamber will be varied, of course, depending upon the weight of the strip material 18 desired to be conveyed through the chamber 10. Perforations 21, 21 $\frac{1}{32}$ inch in diameter on $\frac{1}{8}$ inch centers are suitable for suspending strip material which upon completion form closed-cell tubular products that range in size from tubes having ½" I.D. with a ¼ inch wall thickness to tubes having ⅞" I.D. with a ¼ inch wall thickness. In order to provide rotation to the strip material as it is advanced through the chamber, the perforations 21a, 21a should be at least about 25% greater in diameter than perforations 21, 21 and may have diameters up to twice those of perforations 21, 21, or even greater.

The dwell time in the heating chamber 10 will depend, of course, on the length of the chamber 10 and on the speed at which the strip material 18 flows down the cushion of air in its advance through the chamber. The rate of advance of the strip material 18 through the chamber 10 can be increased by rasing the front end of the chamber 10 in order to increase the cant which the chamber makes with the horizontal.

While in the embodiment of this invention that is shown and described the perforations 21, 21 (with the exception of perforations 21a, 21a) are shown to be of uniform size and spacing throughout the entire length of the plenum plate 20, it will be appreciated that such perforations need not all be of uniform size and spacing to obtain the desired floating of the strip material on a cushion of air as the strip material is advanced through the heating chamber. Thus, perforations 21, 21 of varying size and spacing may be used in the plenum plate, so long as the entire zone of the plenum plate beneath the desired path of advance of the strip material is perforated sufficiently to provide the essential cushion of air for suspending the strip material out of contact with the plenum plate during the advance of the strip material through the heating chamber. Zones of different void area even may be provided along the length of the plenum plate for compensating for changes in the density of the strip material as it expands or for conveying the strip material at different heights above the plenum plate in different zones of the heating chamber.

It also will be appreciated that, instead of raising or lowering the front end of the heating chamber 10, other arrangements for providing the desired cant to the heating chamber can be employed. For example, the front end of the heating chamber can be pivotally mounted in an elevated position and means for raising or depressing the back end of the heating chamber can be provided.

It further will be appreciated that the upwardly directed force for causing rotation of the strip material may be accomplished by means other than the enlarged perforations 21a, 21a. For example, perforations 21a, 21a might be the same size as perforations 21, 21 and air under greater pressure than in the lower section of the chamber might be directed upwardly through the perforations 21a, 21a from a separate air supply.

I claim:
1. Apparatus useful in the manufacture of cylindrical shaped rubber or rubber-like strip material which comprises a heating chamber through which a discrete length of cylindrical shaped strip material advances and in which the strip material is heated, said heating chamber being separated into an upper section and a lower section by a plenum plate extending transversely between the side walls of the heating chamber and extending longitudinally from the front wall of the heating chamber to the back wall of the heating chamber, said front wall of said heating chamber being provided with an opening positioned adjacent one end of said plenum plate for allowing the strip material to be fed into the zone immediately above the upper surface of said plenum plate, said back wall of said heating chamber being provided with an opening positioned adjacent the other end of said plenum plate through which the strip material can be discharged from the heating chamber, the central longitudinally extending zone of said plenum plate having closely-spaced perforations therein extending the length of the plenum plate and through which air under pressure can escape from the said lower section in said heating chamber into the said upper section in said heating chamber, means for continuously introducing heated air into the said lower section of the heating chamber under a pressure sufficiently greater than the pressure of the air in the said upper section of the heating chamber that the velocity of the air passing continuously through the said perforations in the said plenum plate from the said lower section to the said upper section of the heating chamber is sufficient to suspend the strip material above the said perforations in the said plenum plate and out of contact with the said plenum plate, and means for directing a force of air upwardly along one side only of the said suspended strip material of sufficient magnitude to cause said strip material to rotate about its longitudinal axis, said heating chamber being canted with respect to the horizontal so that the heating chamber and plenum plate slope downwardly from the forward end of the heating chamber into which the strip material is fed toward the rear end of the heating chamber from which the strip material is discharged whereby the strip material will flow naturally when suspended on the cushion of air toward the discharge end of the heating chamber.

2. The apparatus of claim 1 in which said means for directing a force of air upwardly along one side only of the said suspended strip material of sufficient magnitude to cause said strip material to rotate about its longitudinal axis comprises perforations along the marginal zone of one side only of said central longitudinally extending zone of the said plenum plate which perforations are of greater diameter than those in the remainder portion of the said central longitudinally extending zone of the said plenum plate.

3. The method for heating a discrete length of cylindrically shaped strip material made from a rubber or rubber-like composition which comprises advancing the strip material into a heating chamber separated into an upper section and a lower section by a plenum plate extending transversely between the side walls of the heating chamber and longitudinally from the front wall of the heating chamber to the back wall of the heating chamber by feeding the strip material into the zone immediately above the upper surface of the said plenum plate, suspending the entire length of strip material within the heating chamber continuously upon a cushion of air emitted under pressure from the said lower section of the heating chamber through closely-spaced perforations provided in the said plenum plate along the entire length of the said plenum plate, rotating said strip material within said heating chamber while said strip material is suspended upon said cushion of air by directing a force of air upwardly along one side only of the said strip material that is greater than the force of air which maintains the strip material suspended above the said plenum plate, advancing the strip material through the heating chamber by canting the heating chamber and plenum plate downwardly as they extend from the forward end of the heating chamber into which the strip material is fed toward the rear end of the heating chamber through which the strip material is discharged.

References Cited
UNITED STATES PATENTS 2,085,842    7/1937    Wentworth _____ 34—156 X
2,211,490    8/1940    Braun _____ 34—156 X CHARLES J. MYHRE, *Primary Examiner.*
JOHN J. CAMBY, *Assistant Examiner.*